(12) United States Patent
Diener et al.

(10) Patent No.: US 10,621,637 B2
(45) Date of Patent: Apr. 14, 2020

(54) SYSTEM AND METHOD FOR OBTAINING ACCOMMODATIONS

(75) Inventors: Robert B. Diener, Miami, FL (US); David S. Litman, Dallas, TX (US)

(73) Assignee: Consumer Club, Inc., Dallas, TX (US)

( * ) Notice: Subject to any disclaimer, the term of this patent is extended or adjusted under 35 U.S.C. 154(b) by 429 days.

(21) Appl. No.: 12/754,667

(22) Filed: Apr. 6, 2010

(65) Prior Publication Data

US 2010/0257001 A1    Oct. 7, 2010

Related U.S. Application Data

(60) Provisional application No. 61/266,663, filed on Dec. 4, 2009, provisional application No. 61/166,965, filed on Apr. 6, 2009.

(51) Int. Cl.
*G06Q 10/02* (2012.01)
*G06Q 30/06* (2012.01)
*G06Q 30/02* (2012.01)

(52) U.S. Cl.
CPC ......... *G06Q 30/0603* (2013.01); *G06Q 10/02* (2013.01); *G06Q 30/0282* (2013.01)

(58) Field of Classification Search
USPC ........................................................ 705/5–6
See application file for complete search history.

(56) References Cited

U.S. PATENT DOCUMENTS

| | | | |
|---|---|---|---|
| 5,794,207 A | 8/1998 | Walker et al. | |
| 6,990,457 B1* | 1/2006 | Litman et al. | 705/5 |
| 7,136,821 B1* | 11/2006 | Kohavi et al. | 705/5 |
| 7,263,494 B1* | 8/2007 | Harris | 705/5 |
| 2003/0097274 A1* | 5/2003 | Parsons | 705/1 |
| 2003/0208387 A1* | 11/2003 | Russell et al. | 705/5 |
| 2007/0067193 A1 | 3/2007 | Robertson | |
| 2007/0203736 A1* | 8/2007 | Ashton | 705/1 |

OTHER PUBLICATIONS

Bradley-Hole "How to get a great hotel rate" Mar. 7, 2007 URL: http://www.nbcnews.com/id/17499628/ns/travel-travel_tips/t/how-get-great-hotel-rate/ Retrieved Jun. 20, 2015.*

* cited by examiner

*Primary Examiner* — Tonya Joseph
(74) *Attorney, Agent, or Firm* — Robert M. Schwartz; Kerry P. Sisselman

(57) ABSTRACT

A system and method are provided whereby a consumer is provided with nonpublic hotel rate accommodations for specifically identified hotels. In particular, a consumer provides a query as to whether a non-public rate exists for an accommodation at a specific hotel or property.

8 Claims, 6 Drawing Sheets

SYSTEM AND METHOD FOR OBTAINING ACCOMMODATIONS

CROSS-REFERENCE TO RELATED APPLICATIONS

The present application claims priority from Provisional Patent Application No. 61/166,965 filed Apr. 6, 2009, and Provisional Patent Application No. 61/266,663 filed on Dec. 4, 2009, both entitled "System and Method for Purchasing Hotel Accommodations", both of those applications being incorporated herein, by reference, in their entireties.

BACKGROUND OF THE INVENTION

The instant invention relates to a system and method for obtaining accommodations, and more particularly, to a system and method for providing a consumer with accommodations at a specific property at a nonpublic rate.

Online systems for obtaining hotel reservations are known. For example, HOTWIRE.COM is an Internet-based website that offers discounted prices on airfare, hotel, rental car, and vacation packages. In the HOTWIRE.COM system, the identity of the participating companies are not identified until after the purchaser has paid for the reservation.

Other Internet-based travel websites also exist wherein a consumer can book a travel related reservation from an online website. As an alternative to booking online, some travel services also maintain a separate call center, for receiving calls from consumers and booking by telephone. For example, EXPEDIA.COM permits a consumer to book online or to call a call center using the exchange 1-800-EXPEDIA.

What is needed is a reservation system that permits the consumer to obtain a travel related reservation at a set rate, but also permits the consumer to make an inquiry about receiving a non-public rate for an accommodation at a specific property.

BRIEF SUMMARY OF THE INVENTION

A system and method are provided whereby a consumer is provided with nonpublic hotel rate accommodations for specifically identified hotels. In one particular embodiment of the present invention, a consumer queries whether a non-public rate exists for a room at a specific hotel. Upon asking for a non-public rate, the consumer is informed of a range of possible rates or discounts for the requested hotel or property. However, in one particular embodiment of the invention, the consumer is not informed of the final price paid or discount obtained until after the consumer has paid for the reservation.

Although the invention is illustrated and described herein as embodied in a system and method for obtaining accommodations, it is nevertheless not intended to be limited to the details shown, since various modifications and structural changes may be made therein without departing from the spirit of the invention and within the scope and range of equivalents of the claims.

The construction of the invention, however, together with the additional objects and advantages thereof will be best understood from the following description of the specific embodiments when read in connection with the accompanying drawings.

DETAILED DESCRIPTION OF THE PREFERRED EMBODIMENTS

The present invention relates to a system and method for facilitating the purchase of hotel accommodations. The term "hotel" is used herein to refer to any type of property or accommodation (i.e., hotel, motel, apartment, condominium, lodge, etc.,) that is reserved and/or rented in the same manner as a hotel. Additionally, the term "purchase" used herein is used to describe a payment made for hotel accommodations, usually, at the time of reserving or obtaining those accommodations.

Figure 1:
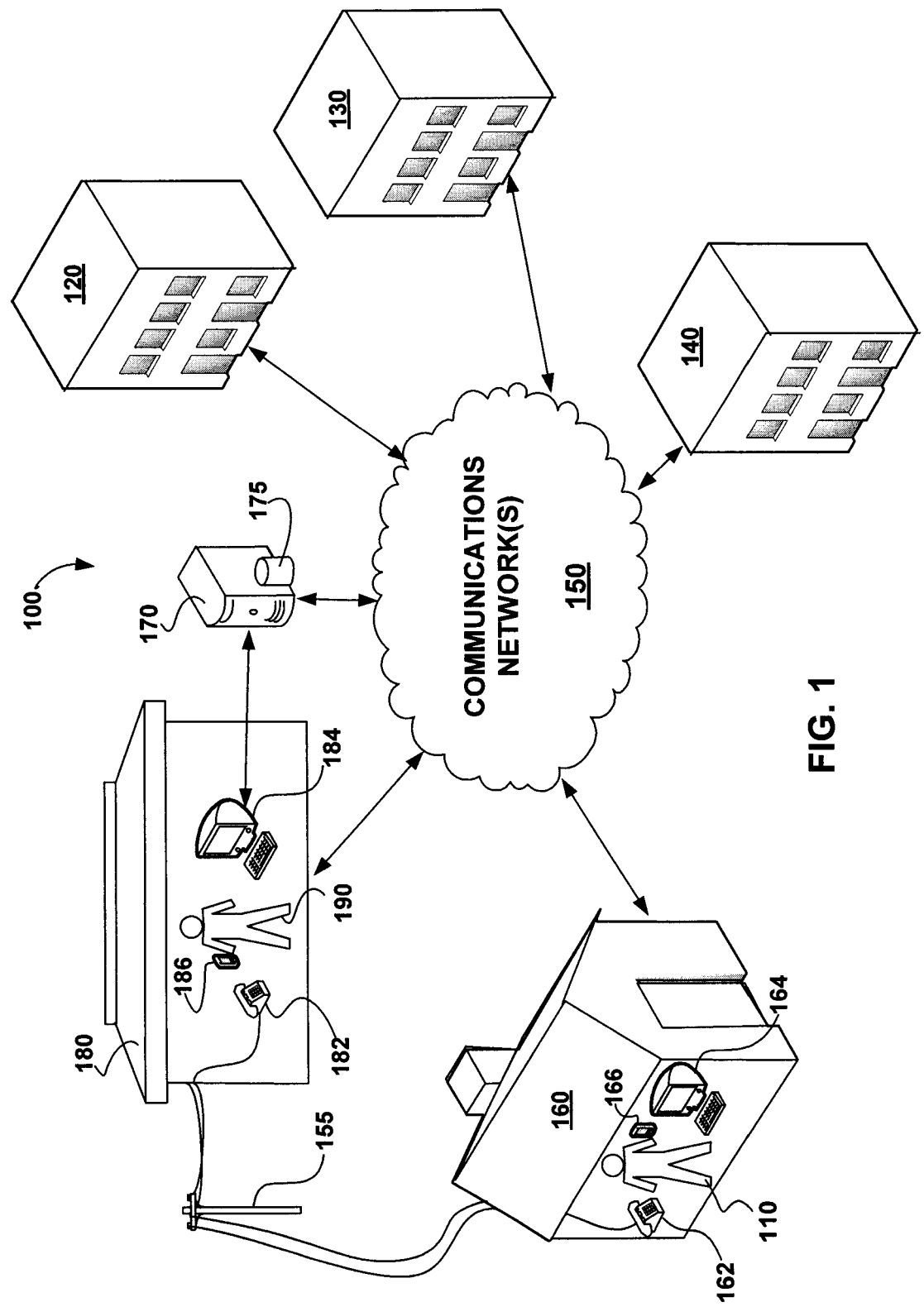
FIG. 1 is a diagram of a system in accordance with one particular embodiment of the present invention.

One particular embodiment of the invention will now be described in connection with FIG. 1. A system 100 is provided wherein hotel accommodations can be obtained by a consumer 110 for any of the hotels 120, 130, 140. Although only three hotels 120, 130, 140 are shown, this is only an example and not meant to be limiting. Rather, it is clearly understood that the invention can be used to offer thousands of hotels to a consumer.

Referring back to FIG. 1, a server 170 is provided that stores information about the rates of the hotels 120, 130, 140 in a database 175. The hotels 120, 130, 140 may be unrelated to one another, as well as, to the owner/manager of the server 170. In one particular embodiment, the server 170 is overseen by a service used by consumers to book reservations for accommodations in the hotels 120, 130, 140. This service does not, itself, have physical control over the accommodations provided to the consumer and/or oversee the hotels 120, 130, 140. Rather the service collects the price data from a plurality of related and unrelated hotels and provides an interface for offering and selling accommodations to the consumer. In one particular embodiment, the server 170 is operated from a call center 180. However, this is not meant to be limiting, as the server 170 can be disposed at a different location, if desired.

As noted above, the server 170 is used to maintain a database 175 of current prices for the hotels 120, 130, 140. These prices include the published accommodation rate available for each hotel 120, 130 and 140, typically available for a hotel. However, in accordance with the present invention, each hotel may also provide a non-public accommodation rate that the hotel 120, 130, 140 is making available exclusively to the facilitator of the service. The database 175 is constantly updated to include current published and non-public rates for accommodations in each of the hotels 120, 130, 140. In one particular embodiment of the invention, each of the hotels 120, 130, 140 provides the updated rate information to the server 170 and the database 175 stored thereon via an electronic connection with the server 170. Alternately, the information can be provided to the service, which manually enters the information into the database 175 using the computer 184.

One particular system 100 and method 300 of the invention will now be described in connection with FIGS. 1-3. More particularly, a consumer 110 provides an inquiry to the database 175 through an online website using, for example, the computer 164. Step 310. Computer 164 is connected to the database 175 via a communications network 150, which, in one preferred embodiment, is the Internet. The consumer can input the inquiry into a graphical user interface (GUI) form 200 available through the website of the service provider. The inquiry can include, among other details, a date or date range and location for a desired hotel for which the consumer 110 is interested in obtaining hotel reservations. Step 320. Such information can be input into blanks in a search box 210 incorporated into the GUI form 200 displayed on a display of the computer 164. As noted above, hotels typically have published accommodation room rates that are stored in the database 175. In response to the consumer 110's query, the server 170 will provide the consumer 110 with information 230, 240 that includes published and publicly available room rate information 250 correlated to specific hotels 235, 245. Step 330. The consumer 110, at this point in the process, has possession of both publicly available rate information 250 and specific hotel identification (i.e., hotel names) 235, 245. If the consumer 110 wishes to book the reservation at the published, publicly available room rate, the consumer clicks on the soft button 260 of the GUI form 200, using a pointer device or mouse (not shown) of the computer 164. Thus, the consumer 110 can use the GUI form 200 on the service provider/facilitator's website to book a hotel accommodation at the public rate.

As noted above, the system 100 of the invention additionally includes nonpublic rates provided by the hotels exclusively to a facilitator, which are additionally stored in a database, such as the database 175. Specific information regarding these nonpublic hotel rates (i.e., a specific price, a specific discount, etc.) are not available to, or accessible by, the consumer 110 from the GUI form 200 on the consumer's computer 164. Rather, the service provider uses the GUI form 200 to encourage the consumer to contact a call center 180 to inquire, in realtime, whether a nonpublic rate is available to the consumer for a given hotel. Thus, at most, the GUI form 200 provides only general information to the consumer 110 indicating that a nonpublic rate may be available to the consumer and that the consumer 110 should open a dialogue with the affiliated call center to find out more information.

In one particularly preferred embodiment of the invention, after the consumer 110 receives public rate information 250 for one or more hotels 235, 245, specifically identified on the GUI form 200 by name. In the present embodiment, the GUI form 200 provides information encouraging the consumer to call a particular telephone number 220 to inquire about nonpublic rates for the same specific hotel or hotels 235, 245, that are lower than the published rates 250 shown on the GUI form 200. Thus, the consumer 110 is encouraged to contact a call center 180 by telephone, to inquire after a lower, nonpublic rate. In response to this encouragement, the consumer 110 then calls the call center 180 to interact, in realtime, with an operator 190 at the call center 180. Step 340. Note, however, that in one embodiment of the invention the operator 190 is a person, as shown in FIG. 1. However, the operator 190 may also be provided as a computerized intelligent voice activated switchboard instead of a person, if desired. As such, as shown in FIG. 1, the consumer 110 can contact the call center 180 via the telephone 162 over the Public Switched Telephone Network (PSTN) or cellular/satellite telephone network 155, where the operator 190 additionally communicates by telephone 182.

However, a realtime dialogue between the consumer 110 and the call center 180 can be established using other methods than the PSTN or cellular/satellite network 155. For example, as an alternative to using the network 155, the consumer 110 can contact the call center 180 using a Voice Over IP (VoIP) protocol, for example, by making an Internet call using the Internet call soft button 270 on the GUI form 200. Such an Internet call can be made using a known service, such as SKYPE™, or with another type of system wherein voice calls are packetized and sent over the communications network 150.

In another embodiment of the invention, the realtime dialogue between the consumer 110 and the call center 180 can be established as a live chat between the consumer 110 and an operator 190 by opening a live chat window on the computer 164, using the soft button 275 on the GUI form 200. In such an embodiment, the consumer 110 and operator 190 communicate in realtime by computer chat. If desired, such a realtime dialogue between the consumer 110 and the operator 190 can also be established using a smartphone, tablet PC or PDA 166. Such a device 166 can be used to communicate, in realtime, with the operator 190 via a computer 184 or smartphone 186 in the call center. Similarly, in one particular embodiment of the present invention, a realtime dialogue between the consumer 110 and an operator 190 at the call center 180 can be transacted by SMS text messaging using a smartphone 166 communicating with a compatible device 186, or another device, at the call center 180.

However, despite the method of conducting the realtime dialogue, it is important to note that, in the present embodiment of the invention, the nonpublic rate is not provided to the consumer as part of the GUI form 200. Rather, the realtime dialogue engaged in between the consumer 110 and the call center includes at least: 1) a query (not in the GUI form 200) from the consumer regarding information about a nonpublic rate for a specifically identified (i.e., named) hotel; and 2) a realtime response from the operator 190 providing information relating to a nonpublic rate.

The call center 180 can be run by the service provider/facilitator, or by a third party call center working in concert with the facilitator to provide nonpublic hotel accommodation rate information to those consumers 110 that contact the call center 180. Such information can be accessed by the operator 190 from the server 170 and database 175 via a computer 184 located in the call center 180 and provided to the consumer 110 by telephone 182. Step 350. If desired, the computer 184 in the call center can additionally be used to update rate information in the database 175 in accordance with information provided by the hotels 120, 130, 140. However, this is not meant to be limiting, as the database 175 can be updated by other computers disposed at other locations, including servers under the control of the owners of the participating hotels 120, 130, 140, via the communications network(s) 150. As noted herein above, one communications network 150 can include the Internet. Alternately, if desired, computers and/or servers associated with the hotels 120, 130, 140 can be directly connected to the server 170 via a telephone communication network 150 (i.e., direct dialup) or by a non-internet communications network (i.e., an Intranet, LAN or WAN) in order to update the database with the public and nonpublic rates provided to the service provider.

Upon receiving information relating to the nonpublic rate, the consumer can choose, at that time, to purchase (i.e., pay for the reservation of) the accommodations in accordance with the information provided by the operator 190. For example, the consumer 110 can provide a credit card number, by telephone, to the operator 190, who secures the reservation at a nonpublic rate. Step 360. The operator 190 can enter information of the reservation into the server 170, via the computer 184. This information can subsequently be provided to the particular hotel via the communications network(s) 150, or by some other method. In one particular example of the invention, the hotel 120, 130, 140 can download the reservation information from the server 170 when accessing the server 170 for updating the price in the database 175. Alternately, information of the reservation can be sent, in realtime, to the specific hotel 120, 130, 140 over the communications network(s) 150.

Figure 3:
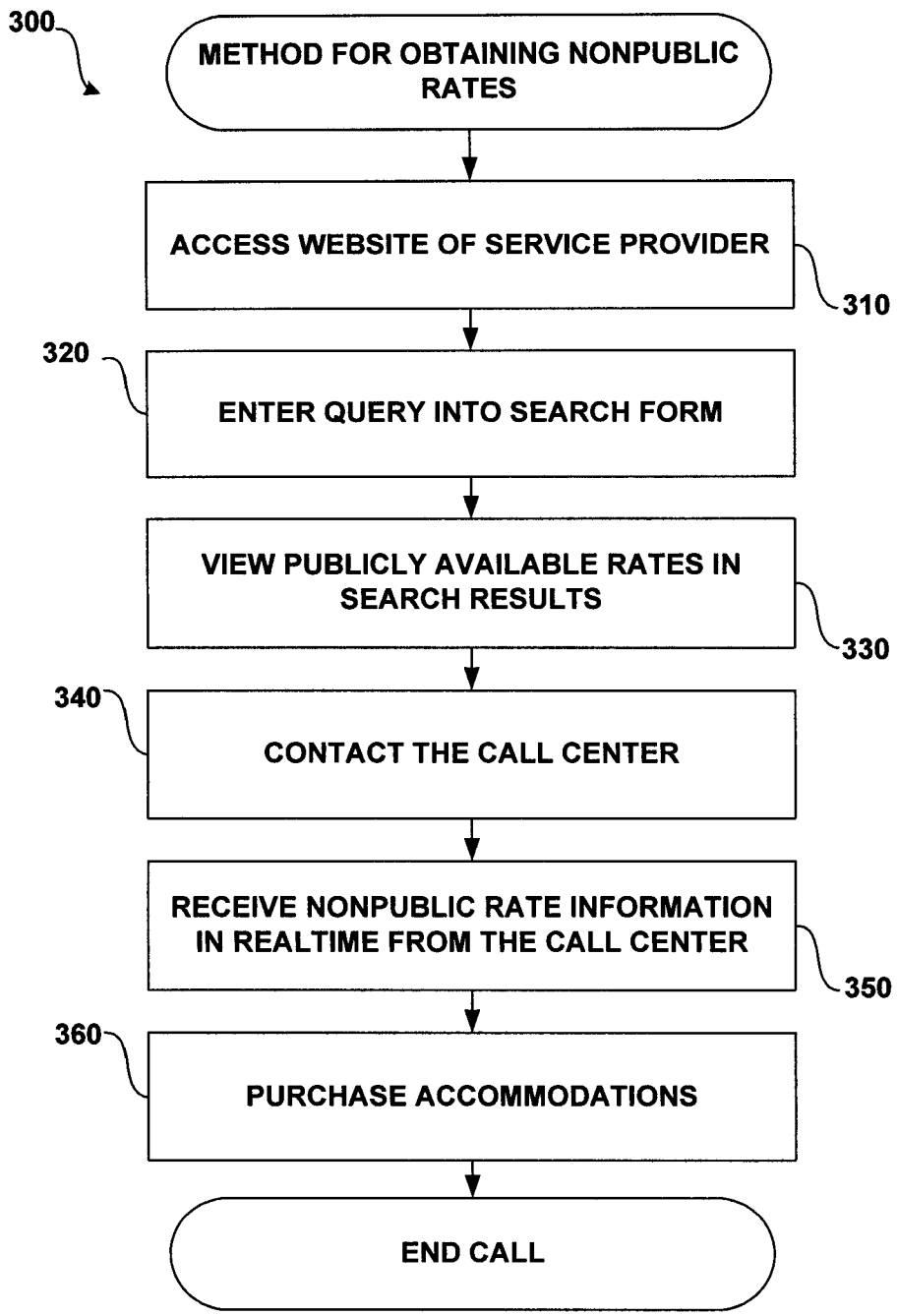
FIG. 3 is a flow chart showing the steps of taken by a consumer to obtain a hotel accommodation in accordance with one particular embodiment of the present invention.
Figure 4:
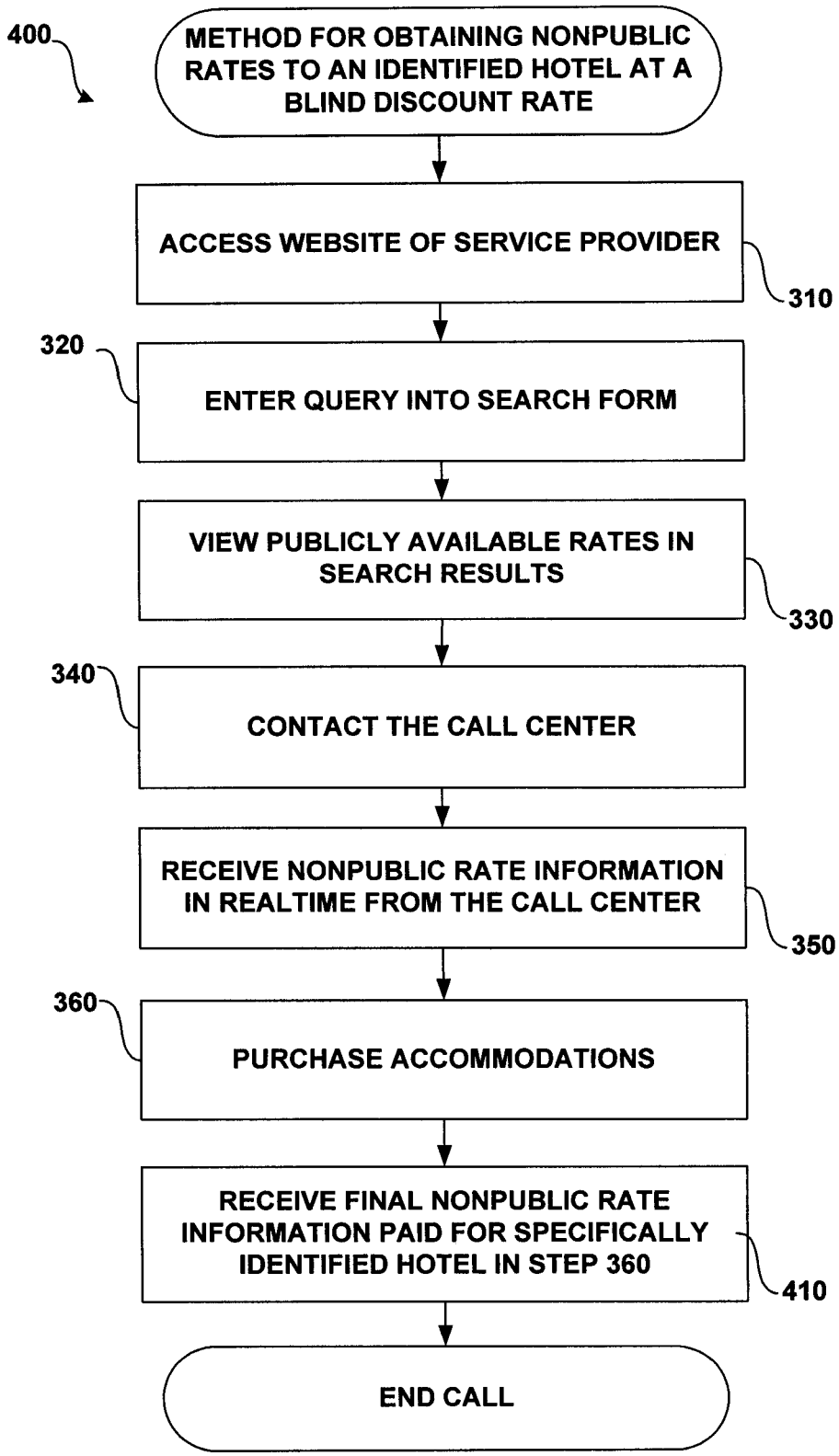
FIG. 4 is a flow chart showing the steps of taken by a consumer to obtain a hotel accommodation in accordance with another particular embodiment of the present invention.

Referring now to FIG. 4, there will be described a method 400 in accordance with another particular embodiment of the invention. More particularly, in the method 400, the identity of a hotel is provided to a consumer prior to purchasing the reservation, but the final purchase price is provided to the consumer only after the purchase has been completed. The method 400 includes steps that are substantially similar to those described above in connection with the method 300 of FIG. 3, and which share the same reference numbers. However, in the method 400 of FIG. 4, the final nonpublic rate paid by the consumer 110 is not disclosed to the consumer 110 until after a purchase has been made. Step 410. Rather, upon contacting the call center 180, and enquiring about a nonpublic rate for a specific hotel, the consumer 110 is provided, in realtime, with a range of possible prices or a range of possible discounts offered by the hotel below the published rates previously viewed by the consumer on the GUI form 200. For example, the consumer can be informed that the final price they will pay may be anywhere between 10% and 25% lower than the published rate 250 for a specifically identified hotel 235. However, the consumer is not informed of, at that time, the exact amount of discount within the range of between 10% and 25%. Thus, the consumer 110 knows the exact identity of the hotel 235 in which the accommodations will be secured (i.e., the Flamingo), but does not know the exact price that he or she will pay for the accommodations, except that the price is lower than the published rate. Only after making a payment to purchase the reservation is the consumer 110 told the final price paid (i.e., the final discount obtained) for the accommodations.

In determining the final rate to be paid by the consumer 110, the operator 190 accesses the nonpublic hotel accommodation rates stored in the database 175 and provides these nonpublic hotel accommodation rates based on rate criteria. As such, based on a predetermined rate criteria, the nonpublic hotel rate at which the accommodation is sold to the consumer 110 can be different than the nonpublic rate stored in the database 175. In one particular embodiment of the invention, the nonpublic rate available to the consumer 110 for purchasing the accommodation includes a markup over the nonpublic rate available to the service provider and stored by the hotel in the database 175.

Figure 2:
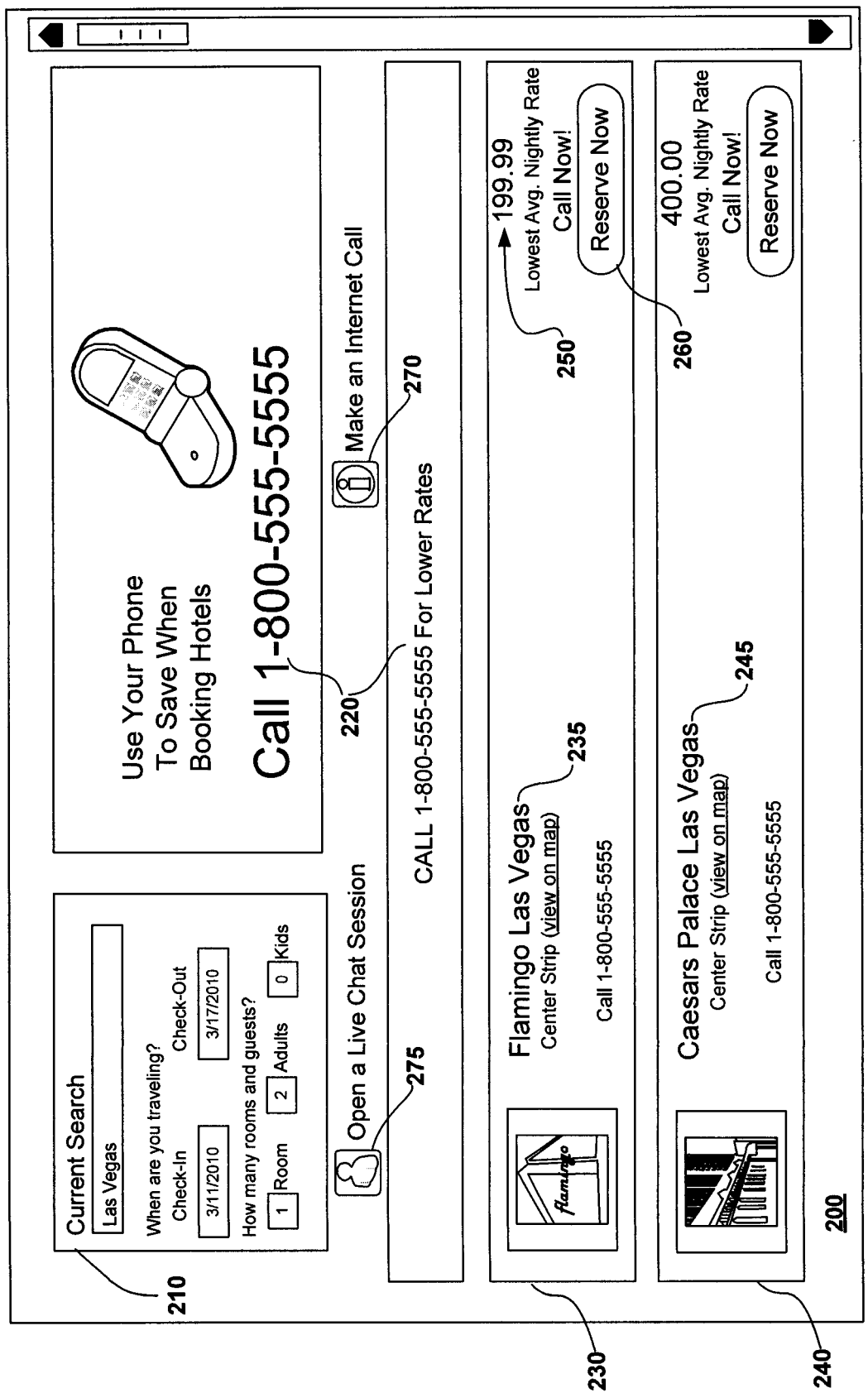
FIG. 2 is an illustration of one possible implementation of a graphical user interface form displayed on the display of a consumer for interacting with a website of the service provider.
Figure 5:
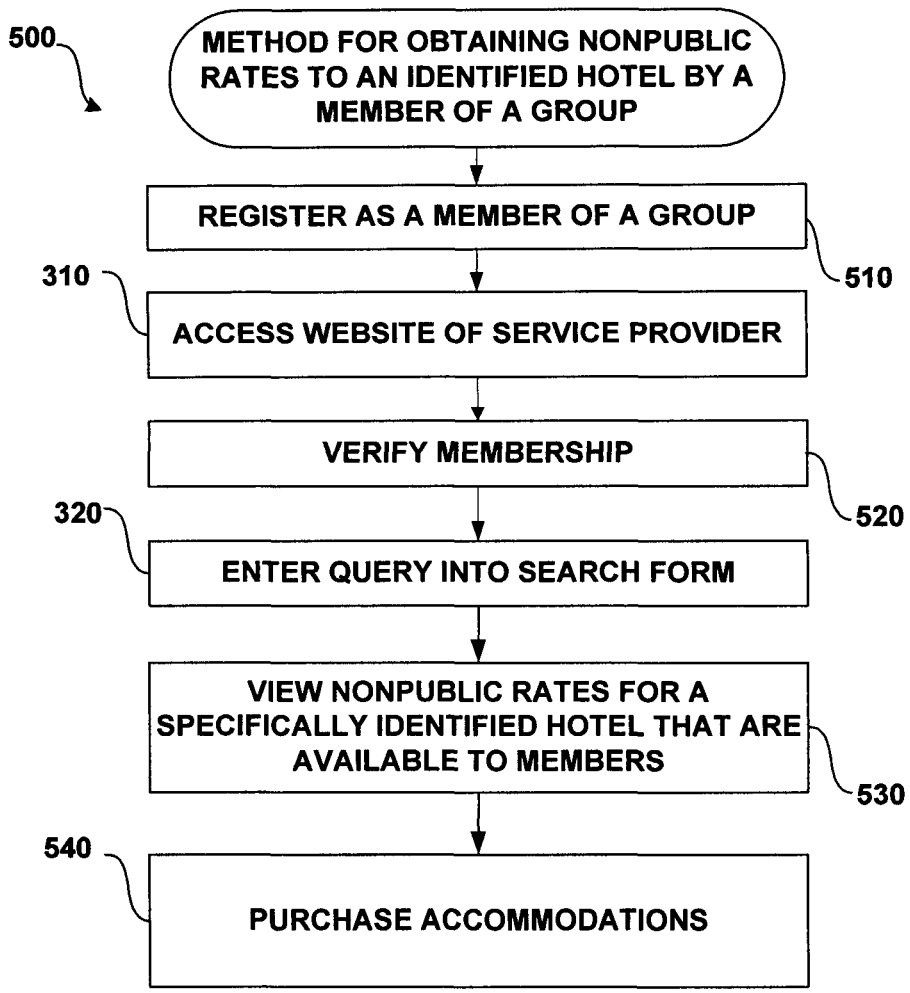
FIG. 5 is a flow chart showing the steps of taken by a consumer to obtain a hotel accommodation in accordance with a further particular embodiment of the present invention.

In another particular embodiment, instead of receiving information of the nonpublic rate as part of a realtime dialogue with a call center, as done in connection with the embodiments of FIGS. 2-4, a consumer is provided with nonpublic rate information via computer, in response to the initial query. Referring more particularly to FIGS. 1 and 5, there will be described a method 500 for providing a consumer 110 with nonpublic rate information for a specifically identified hotel 120, 130, 140, based on that consumer's membership in a group. First, a consumer 110 registers as a member of a particular group. Step 510. This registration can be made either by computer 164, or by calling a call center 180 by telephone. The consumer 110 provides membership registration information to the service provider, whereby the potential consumer 110 is joined into a group.

Once registered, the consumer 110 accesses the service provider's website. Step 310. However, information of the nonpublic hotel accommodation rate is not immediately accessible by the consumer 110 on the website. Rather, the accessibility of the nonpublic hotel rate accommodation information becomes accessible by the consumer 110 upon that the consumer 110 is a member of a group entitled as to access the nonpublic hotel accommodation rate information requested. Step 520.

After verification, the consumer 110 is granted access to nonpublic hotel rate accommodation information for specifically identified hotels. In the instant embodiment, access to nonpublic rate information and hotel identification is given to the consumer even before a consumer commits to purchasing any particular accommodations. Step 530. After reviewing the nonpublic rate information for a specific hotel accommodation, the consumer 110 may choose to secure (i.e., purchase) the reservation by making payment for the accommodations online. Step 530.

Figure 6:
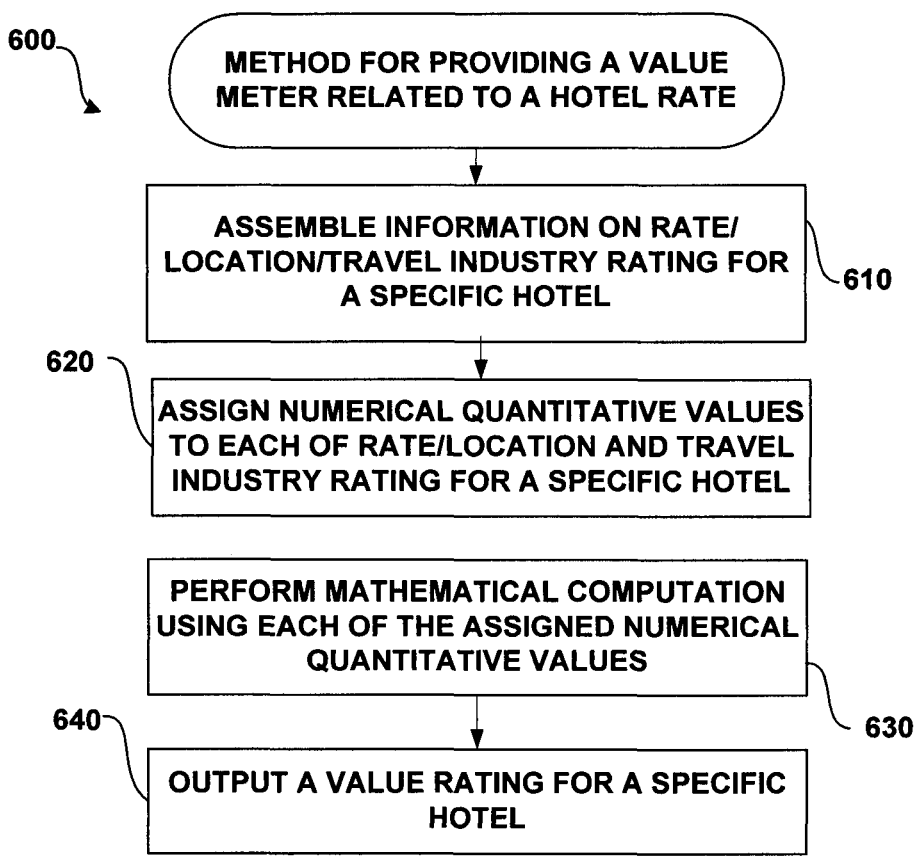
FIG. 6 is a flow chart showing a method for providing a value meter rating for a particular accommodation to a consumer in accordance with one particular embodiment of the present invention.

Referring now to FIG. 6, there is provided a method 600 for providing a value meter relating to the value of a hotel rate, in accordance with one particular embodiment of the invention. The value meter value can be provided to the consumer in order to inform the consumer of the calculated value of a particular hotel, for purposes of providing the consumer with comparator information. More particularly, the provided value meter values can be used by a consumer in evaluating particular hotel room accommodations. In method 600, an entity, designated as an evaluator, acquires hotel accommodation information. Step 610. The evaluator may be the same entity as the service provider/facilitator, an entity that works in concert with a facilitator, or another entity as desired. The evaluator will acquire hotel information and assemble information including, but not limited to, public accommodation rate information, location, and travel industry ratings for specific hotel accommodations. Step 620.

Then, the evaluator will assign numerical quantitative values to each of rate, location, and travel industry ratings, for specific hotel accommodations. Step 630. The quantitative values will then undergo mathematical computation in order to arrive at a value rating. Step 640. The mathematical computation performed is specified by the facilitator. The use of the mathematical computation may equally evaluate rate, location, and travel industry rating information or, alternatively, may give unequal weight to any one or combination of the quantitative values assigned to rates, location, and travel industry ratings.

The value rating obtained by the mathematical computation is used by a facilitator in providing information to a potential hotel accommodation consumer, whereby the consumer is able to compare different hotel accommodations based on the mathematical value rating. For example, in the embodiments of FIGS. 2-4, the value meter rating for a specific hotel may be provided to the consumer 110 by the operator 190. Alternately, in some embodiments, including the embodiment of FIG. 6, the value meter value for a specific hotel can be included on the website of the service provider.

Although described herein in connection with accommodations, it should be understood that the principles of the present invention can be applied to airplane reservations, cruise reservations, car reservations, etc., without departing from the scope and spirit of the present invention. Additionally, it should be noted that the operator 190 affiliated with a call center 180 can be, and preferably is, a live operator, this is not meant to limit the invention only thereto. It should be understood that, the operator 190 can be embodied by an intelligent, computerized operator 190 utilizing preprogrammed scripts to interact, in realtime, with the consumer 110.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

We claim:

1. A method for communicating via two channels of communication, comprising:
    providing a system having two channels of communication between a consumer and a service provider, with a first communications channel including a computer based graphical user interface (GUI) form and a second channel including a non-GUI form based communications channel;
    gathering, with a server of the service provider from a plurality of sources not associated with the service provider or each other, information about hotel accommodations for a plurality of hotels not under the control of the service provider, the information including public rates for hotel accommodations at specific hotels and nonpublic rates at the specific hotels that are lower than the public rates for the specific hotels;
    storing the information in an electronic database of the service provider, wherein the information in the electronic database including public rates is accessible by the consumer over a computer network via the GUI form of the first communications channel, and the information including nonpublic rates is not accessible by the consumer via the GUI form of the first communications channel, updated public and non-public rate information for said plurality of hotels being provided to the server and the database via an electronic connection with the server;
    using at least one criteria entered by the consumer into said computer based GUI form to automatically, electronically search the electronic database for hotel accommodations that meet the at least one criteria entered by the consumer;
    formatting the results of the search for display on a display device of the consumer, the results including at least one hotel specifically identified by name that meets the at least one criteria, the public rate information for the at least one hotel specifically identified and a prompt to the consumer to use the second communication channel to open a realtime dialogue with a call center associated with the service provider to inquire about a nonpublic rate for the at least one hotel specifically identified by name;
    after the formatting step, engaging in a realtime dialogue between the consumer and the call center via the second communications channel, the realtime dialogue occurring via at least one of SMS message or live computer chat, the realtime dialogue including at least: 1) a query, not in the GUI form, from the consumer regarding information about a lower nonpublic rate available to the consumer for the at least one hotel specifically identified by name, and, 2) a realtime response providing information relating to a lower nonpublic rate for the at least one specifically identified hotel, the lower nonpublic rate being obtained by accessing the database from the call center; and
    accepting payment by the service provider from the consumer to secure accommodations in the at least one specifically identified hotel at a final nonpublic rate available to the consumer and storing a reservation for the accommodations in the server of the service provider.

2. The method of claim 1, wherein the at least one criteria includes at least one of: geographical location of interest, hotel name, check-in date and check-out date.

3. The method of claim 1, wherein the network includes the Internet.

4. The method of claim 1, wherein the final nonpublic rate available to the consumer of accommodations in the specifically identified hotel is not disclosed to the consumer until after the accepting payment step, whereby the consumer is not informed of the actual, final nonpublic rate paid by the consumer for the accommodations until after paying for the accommodations.

5. The method of claim 1, wherein a specific monetary amount of a nonpublic rate available to the consumer is not provided to the consumer as part of the formatted results.

6. The method of claim 5, including the step of providing, as part of the formatted results for display on a display device of the consumer, a telephone number of a call center.

7. The method of claim 6, including the step of providing, in realtime over the telephone to a consumer who calls the telephone number of the call center, information regarding the availability of a nonpublic rate available for the at least one specifically identified hotel.

8. A system configured to perform the method of claim 1, the system comprising:
    a computer in digital communication with a first channel of communication, said computer programmed to access a website of a service provider via a computer based graphical user interface (GUI) form, said computer located remote from the service provider and including an input device and a display;
    a server of the service provider including information gathered from a plurality of sources not associated with the service provider or each other, the information about hotel accommodations for a plurality of hotels not under the control of the service provider, the information further including public rates for hotel accommodations at specific hotels and nonpublic rates at the specific hotels that are lower than the public rates for the specific hotels;
    an electronic database in digital communication with said server, the electronic database containing the information, said electronic database configured to provide access to the public rates using the GUI form via the first communications channel, said electronic database configured to render the nonpublic rates inaccessible by the GUI form over the first communications channel;

said electronic database configured to automatically, electronically search the electronic database for public rates information for hotel accommodations that meet the at least one criteria entered into said computer based GUI form, updated public and non-public rate information for said plurality of hotels being provided to the server and the database via an electronic connection with the server;

said server outputting results of the search for display on the display device, the results including at least one hotel specifically identified by name that meets the at least one criteria, the public rate information for the at least one hotel specifically identified and a prompt to use a second communication channel to open a realtime dialogue with a call center associated with the service provider to inquire about a nonpublic rate for the at least one hotel specifically identified by name;

a second communication channel, separate from said computer GUI form and providing a non-GUI form based communications channel, said second communication channel configured for facilitating a realtime dialogue between a consumer and the call center, subsequent to a display of query results on the display, said second communication channel including at least one of SMS message or live computer chat, and the realtime dialogue occurs via said at least one of SMS message or live computer chat, the realtime dialogue including at least: 1) a query, not in the GUI form, from the consumer regarding information about a lower nonpublic rate available to the consumer for the at least one hotel specifically identified by name, and, 2) a realtime response providing information relating to a lower nonpublic rate for the at least one specifically identified hotel based on a nonpublic rate obtained from the database by the call center; and said server additionally configured to process a payment to secure accommodations in the at least one specifically identified hotel at a final nonpublic rate available and to store a reservation for the accommodations.

\* \* \* \* \*